US005682465A

United States Patent [19]
Kil et al.

[11] Patent Number: 5,682,465
[45] Date of Patent: Oct. 28, 1997

[54] LEARNING METHOD OF NON-LINEAR NETWORK FOR NON-LINEAR FUNCTION APPROXIMATION

[75] Inventors: Rhee-Man Kil; Jin-Young Choi, both of Daejeon, Rep. of Korea

[73] Assignee: Electronics and Telecommunications Research Institute, Daejeon-shi, Rep. of Korea

[21] Appl. No.: 288,203

[22] Filed: Aug. 9, 1994

[30] Foreign Application Priority Data

Aug. 10, 1993 [KR] Rep. of Korea ............... 93-15497

[51] Int. Cl.⁶ .................. G06E 1/00; G06F 15/18
[52] U.S. Cl. .................................. 395/23; 395/21
[58] Field of Search ................... 395/20–25, 27; 382/155–159

[56] References Cited

U.S. PATENT DOCUMENTS 5,058,179 10/1991 Denker et al. .................. 382/158
5,153,923 10/1992 Matsuba et al. ................ 382/158

OTHER PUBLICATIONS

Moody, John et al.; "Fast Learning in Networks of Locally-Tuned Processing Units": Oct. 1988, pp.281–294; Yale Computer Science, New Haven, CT.
R. Scott Crowder, III; "Predicting the Mackey–Glass Timeseries with Cascade-Correlation Learning": pp. 117–123; School of Computer Science, Carnegie Mellon Univ., Pitts., PA.
Hwang et al, "Unsupervised learning . . . projection pursuit"; 1993 IEEE Internation Conference on Neural Networks, pp. 1486–1491 vol. 3, Mar. 1993.
Xu et al, "Kernel regression and radial basis . . . Theoretical studies"; IJCNN, pp. 818–823 vol. 1, Jun. 1992.
Lee et al, "Control of nonlinear system . . . function network"; 1991 IEEE International Conference on Neural Networks, pp. 1039–1046 vol. 2, Nov. 1991.
Ogawa et al, "Optimally Generalizing Neural Networks"; 1991 IEEE Internation Joint Conference on Neural Networks, pp. 2050–2055 vol. 3, Nov. 1991.

*Primary Examiner*—Tariq R. Hafiz
*Attorney, Agent, or Firm*—Larson and Taylor

[57] ABSTRACT

A function approximation method is provided which is based on nonparametric estimation by using a network of three layers, such as an input layer, an output layer and a hidden layer. The input and the output layers have linear activation units while the hidden layer has nonlinear activation units which have the characteristics of bounds and locality. The whole learning sequence is divided to two phases. The first phase estimates the number of kernel functions based on a user's requirement on the desired level of accuracy of the network, and the second phase is related to parameter estimation. In the second phase, a linear learning rule is applied between output and hidden layers and a non-linear (piecewise-linear) learning rule is applied between hidden and input layers. Accordingly, an efficient way of function approximation is provided from the view point of the number of kernel functions as well as increased learning speed.

8 Claims, 4 Drawing Sheets

LEARNING METHOD OF NON-LINEAR NETWORK FOR NON-LINEAR FUNCTION APPROXIMATION

BACKGROUND OF THE INVENTION

1. Field of the Invention

The present invention relates to a function approximation based on nonparametric estimation by using a network of three layers, an input layer, an output layer and a hidden layer.

2. Description of the Prior Art

An artificial neural network can be evaluated in terms of its capability of accurately representing a desired input-output mapping through efficient training of a given set of teaching patterns. An accurate representation of a mapping depends on the proper selection of a network configuration including the network architecture, the number of neurons and the type of activation functions, and the capability of a learning algorithm to find the optimal parameters for the selected network configuration.

Most artificial neural networks developed up to date have focused on training the parameters of a fixed network configuration selected by the designer. However, it may be an extremely powerful tool for constructing an optimal network, if a learning algorithm has a capability of automatically configuring a neural network, in addition to the adjustment of network parameters. Although attempts have been made to apply the idea of self-recruiting neurons to the automatic clustering of input samples and to the identification of class boundaries, a major effort needs to be expended to establish a learning algorithm capable of automatically configuring a network based on the self-recruitment of neurons with a proper type of activation functions.

As an effort of such approach, a non-sigmoidal Mapping Neural Network (MNN) called the "Potential Function Network (PFN)" has been presented. The PFN is capable of approximating a "many to one" continuous function by a potential field synthesized over the domain of the input space by s number of computational units called "Potential Function Units (PFUs)".

Recently, Moody and Darken ("Fast learning in networks of locally-tuned processing units" Neural Computation, 1:281–294, 1989) successfully train the continuous functions using a three-layer network with hidden units which have localized receptive fields. However, their approach is lacking the flexibility of determining the proper number of hidden units according to the desired level of accuracy in the function approximation. In PFN, the emphasis is Given to the synthesis of a potential field based on a new type of learning called the "Hierarchically Self-Organizing Learning (HSOL)" (S. Lee and R. M. Kil "A gaussian potential function network with hierarchically self-organizing learning," Neural Networks, 4(2):207–224, 1991). The distinctive feature of HSOL is its capability of automatically recruiting necessary PFUs under the paradigm of hierarchical learning, implemented through the successive adjustment of the accommodation boundaries or the effective radii of individual PFUs in the input domain.

The parameter adaption in HSOL was based on Error-Back-Propagation (EBP) algorithm (D. E. Rumelhart, G. E. Hinton, and R. J. Williams, Parallel Distributed Processing, volume 1, pages 318–362. MIT Press/Bradford Books, 1986). However, EBP algorithm does not guarantee convergence and generally suffers slow learning. In this point of view, a new method of parameter estimation in which linear learning rule is applied between hidden and output layers while nonlinear (piecewise-linear) learning rule is applied between input and hidden layers, is considered. The linear learning rule updates the output weights between hidden and output layers based on the Linear Minimization of Mean Square Error (LMMSE) sense in the space of kernel functions while the nonlinear learning rule updates the parameters of kernel functions based on the gradient of the actual output of network with respect to the parameters (especially, the shape) of kernel functions. This approach of parameter adaptation provides near optimal values of the parameters associated with kernel functions in the sense of minimizing mean square error.

SUMMARY OF THE INVENTION

Accordingly, an object of the present invention is to provide an efficient way of function approximation from the view point of the number of kernel functions as well as learning speed.

According one aspect of the invention, a learning method of a non-linear network consisting of an input layer, an output layer and a hidden layer for non-linear function approximation comprises a first step of determining the number of kernel functions in accordance with requirement for the level of accuracy of the network and a second step of parameter estimation of the network, wherein linear learning rule is applied between the output layer and the hidden layer while non-linear learning rule is applied between the hidden layer and the input layer.

In the above learning method, the first step determining the number of kernel functions comprises steps of presenting a new input pattern to the network; getting an actual output of the network and calculating an error of the network; comparing the error of the network with an error criteria; recruiting a new kernel function, adjusting the k+1-th output weight vector of the new kernel function, and increasing k by 1 in case that the error is larger than the error criteria; determining whether one epoch of patterns are to be presented to the network or not in case that the error is not larger than the error criteria, and estimating the rms of the network if one epoch of patterns are presented to the network, otherwise, going to step 1 with the next input pattern; comparing the rms of the network with the specified error in case that one epoch of patterns are presented to the network; and going to step 1 with the first input pattern after decreasing the error criteria by decrement rate in case that the rms of the network is larger than the specified error.

Also in this method, the parameter estimation between the output layer and the hidden layer comprises steps of presenting a new input pattern to the network; getting an actual output of the network, and calculating an error of the network; updating a parameter vector of kernel functions; increasing the epoch of patterns by 1, and going to said first step with the first input pattern if the epoch of patterns is not larger than the specified number in case that one epoch of patterns are presented to the network; and going to said first step with the next input pattern in case that one epoch of patterns are not presented to the network.

Furthermore, the par&meter estimation between the hidden layer and the input layer comprises steps of presenting a new input pattern to the network; getting an actual output of the network, and calculating an error of the network; updating an output weight vector of kernel functions; increasing the epoch of patterns by 1, and going to said first step with the first input pattern if the epoch of patterns is not larger than the specified number in case that one epoch of patterns are presented to the network; and going to said first step with the next input pattern in case that one epoch of patterns are not presented to the network.

DETAILED DESCRIPTION OF THE PREFERRED EMBODIMENTS

Figure 1:
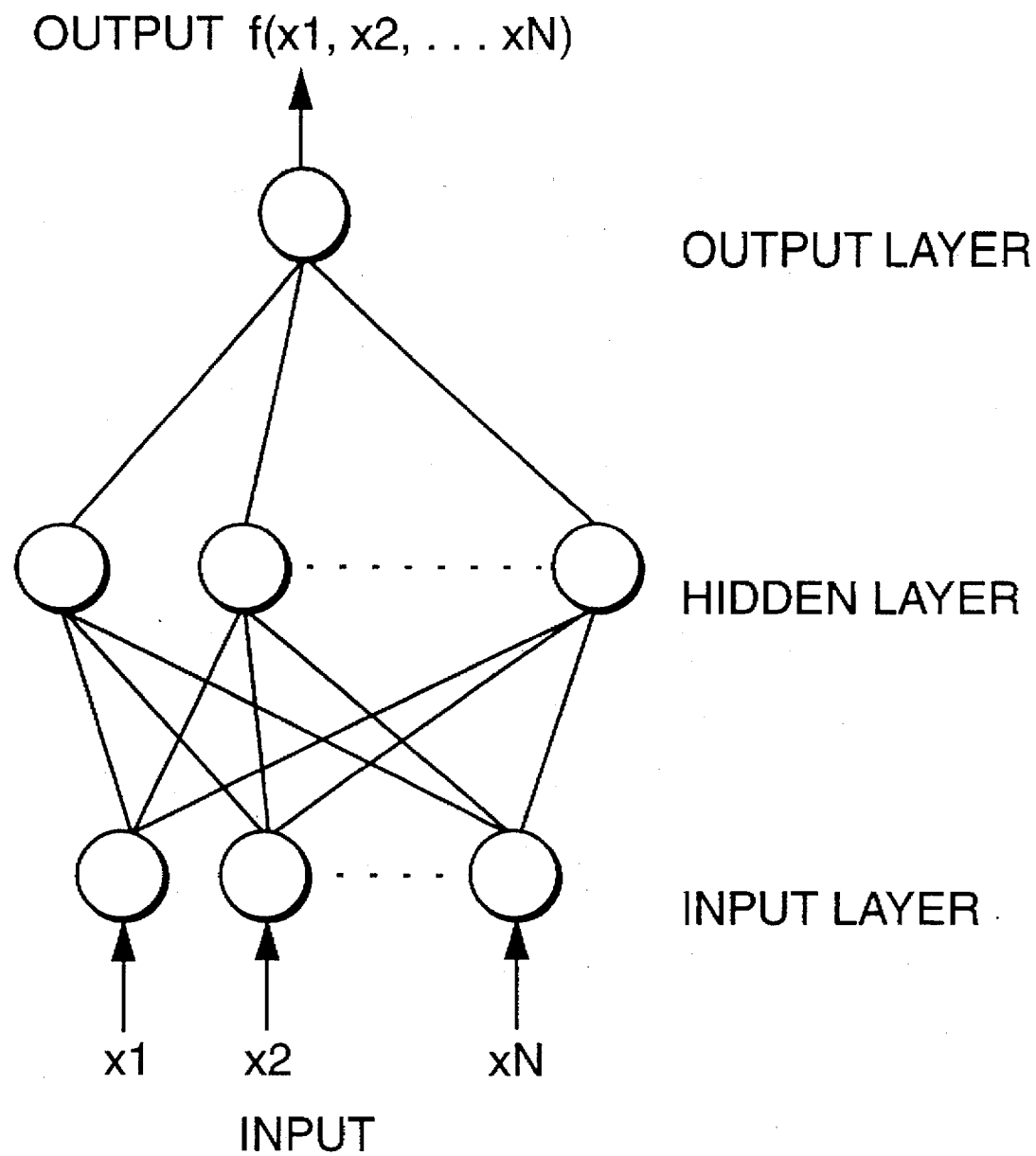
FIG. 1 is a schematic diagram of a nonlinear network.
Figure 2:
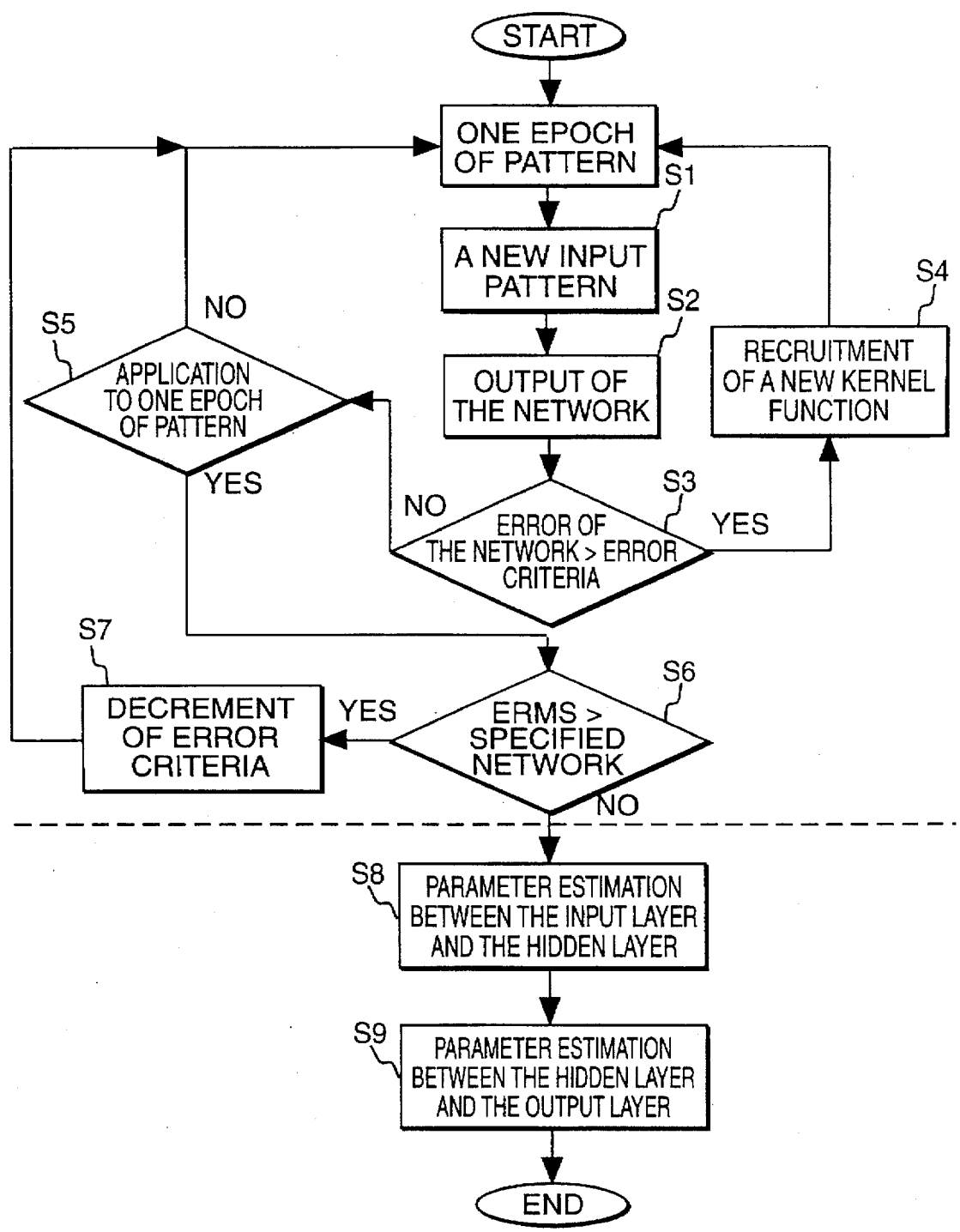
FIG. 2 is a flow chart of learning.

As shown in FIG. 1, an input and an output layers have linear activation units while a hidden layer has nonlinear activation units or kernel functions which have the characteristics of bounds and locality, which can be generated as an equation of $$\phi(x) = \sum_{i=1}^{M} c_i \psi(x, p_i) \quad (1)$$

where M represents the number of kernel functions, $c_1$ represents summation weight, and $p_1$ represents a parameter vector related to the shape of the i-th kernel function. Additionally, the kernel functions have the following properties.

1. Bounds:

$$L_\psi \leq \psi(x, p) \leq U_\psi \quad (2)$$

where $L_\psi$ and $U_\psi$ represent the lower and the upper bounds of $\psi(x,p)$ respectively.

2. Locality:

$$\int_{-\infty}^{+\infty} \left(\frac{1}{a}\right)^{N_\psi} \psi(x, P_a) dx = C \quad (3)$$

$$\lim_{a \to 0} \left(\frac{1}{a}\right)^{N} \psi(x, P_a) = C\delta(x) \quad (4)$$

Where N is the dimension of an input, x and C is a positive constant.

There are many functions satisfying the above conditions. The examples of such kernel functions are $$f(\chi, a) = e^{-\frac{\pi \chi^2}{a^2}} \quad (5)$$

$$f(\chi, a) = \text{Sinc}\left(\frac{\chi}{a}\right) = \frac{a}{\pi \chi} \sin\left(\frac{\pi \chi}{a}\right) \quad (6)$$

$$f(\chi, a) = \text{Rect}\left(\frac{\chi}{a}\right) = \begin{pmatrix} 1 & \text{if } |\chi| \leq \frac{a}{2} \\ 0 & \text{otherwise} \end{pmatrix} \quad (7)$$

Any nonlinear function can be approximated by using the above method (equation 1) (R. M. Kil. Approximation and Inverse Mapping of Continuous Function in the Paradigms of Connectionist Models: Theories and Applications, PhD thesis, University of Southern California, 1991).

However, in the present invention, Gaussian kernel functions are used for training the network. The Gaussian kernel function $\psi_i$ according to the invention is defined as follows:

$$\psi_i = \psi(x, p_i) = e^{-d(x, p_i)/2} \quad (8)$$

$$d(x, p_i) = d(x, m_i, \sigma_i) = \frac{\|x - m_i\|^2}{\sigma_i^2} \quad (9)$$

where $m_i$ and $\sigma_i$ represent respectively a mean vector and a standard estimation of the i-th Gaussian kernel function.

For the proposed network, as shown in FIG. 1, learning concerns mainly about the determination of minimally necessary number of kernel functions and the estimation of parameters of the network. The strategy to decide the minimally necessary number of kernel functions is to increase the number of kernel functions incrementally whenever a new kernel function needs to be defined for the further improvement of network performance, that is, reducing the network error for the teaching patterns. The network performance can be related with the root mean square error defined by $$E_{rms} = \sqrt{\frac{1}{N} \sum_{k=1}^{N} (y_k - \hat{y}_k(x_k))^2} \quad (10)$$

where N represents the number of training patterns, $(x_k, y_k)$ represents (input, output) training patterns, and $\hat{y}_k(x_k)$ represents an actual output of the network for the given k-th input training pattern, $x_k$.

The above process of minimizing the mean square error is divided by two learning phases, the first phase recruiting the necessary number of kernel functions based on given function approximation and the second phase estimating the parameter for the given network.

For this purpose, a new method of parameter estimation in which linear learning rule is applied between output and hidden layers while non-linear (piecewise-linear) learning rule is applied between hidden and input layers is suggested.

Phase 1 Learning: Recruiting the Necessary Number of Kernel Functions

In phase 1, the number of kernel functions is estimated during function approximation when the necessary kernel functions are recruited and output weights of kernel functions are determined.

First, a k×k matrix, $\psi_k$ is defined as $$\psi_k = \begin{vmatrix} \psi_{11} & \psi_{12} & \cdots & \psi_{1k} \\ \psi_{21} & \psi_{22} & \cdots & \psi_{2k} \\ \cdot & \cdot & \cdots & \cdot \\ \psi_{k1} & \psi_{k2} & \cdots & \psi_{kk} \end{vmatrix} \quad (11)$$

where $\psi_{ij}$ represents the output of the j-th kernel function for the i-th input teaching pattern.

Additionally, a k dimensional vector, $y_k$ is defined as $y_k = [y_1, y_2, \ldots, y_k]^T$ where $y_i$ represents the i-th output teaching pattern. Then the output weight vector, $c_k = [c_1, c_2, \ldots, c_k]^T$ where $c_i$ represents the output weight of the i-th kernel function is given by $$c_k = \psi_k^{-1} y_k \quad (12)$$

In this case, if a new kernel function is recruited, the k×k matrix, $\psi_k$ is given by the following k+1×k+1 matrix, $\psi_{k+1}$.

$$\psi_{k+1} = \begin{vmatrix} \psi_k & \vdots & u \\ \cdots & \cdots & \cdots \\ v^T & \vdots & \psi_{k+1k+1} \end{vmatrix} \quad (13)$$

where, u is a k dimensional vector defined by $u=[\psi_{1k+1}, \psi_{2k+1}, \ldots \psi_{kk+1}]^T$, and v is a k dimensional vector defined by $v=[\psi_{k+11}, \psi_{k+12}, \ldots, \psi_{k+1k}]^T$.

According to the recruitment of a new kernel function, the following equation is given between a new k+1 dimensional output weight vector, $c_{k+1}=[c_1, c_2, \ldots c_k, c_{k+1}]^T$ and a k+1 dimensional output training vector, $y_{k+1}=[y_1, y_2, \ldots y_k, y_{k+1}]^T$.

$$c_{k+1} = \psi_{k+1}^{-1} y_{k+1} \quad (14)$$

Using the above described process, the recursive of inverse matrix can be derived. And based on this derivation, the estimation procedure is summarized as follows:

Estimation Procedure (Initial Condition: k=0, n=1, $y_i=0$)

Step 1: Present a new input pattern, $x_n$ to the network
Step 2: Get an actual output of the network, $\hat{y}_n = \Phi(x_n)$, and calculate an error of the network, $e_n = y_n - \hat{y}_n$
Step 3: Comparing the error of the network, $e_n$ and an error criteria, $e_c$
Step 4: If $e_n > e_c$, recruit a new kernel function such that $$m_{k+1} = x_n \quad (15)$$

$$\sigma_{k+1} \propto \min_i \|x_n - m_i\| \quad (16)$$

and adjust k+1-th output weight value $c_{k+1} = [c_k^{new}, c_{k+1}]^T$ of the kernel function according to the follows:

$$c_k^{new} = c_k^{old} + b e_n \quad (17)$$

$$c_{k+1} = c e_n \quad (18)$$

Where, the k-th vector, b and a constant c, are as follows:

$$b = -\frac{\psi_k^{-1} u}{\psi_{k+1k+1} - v^T \psi_k^{-1} u} \quad (19)$$

$$c = +\frac{1}{\psi_{k+1k+1} - v^T \psi_k^{-1} u} \quad (20)$$

The k×k matrix, A and the k-th vector, d are as follows:

$$A = \psi_k^{-1} + \frac{\psi_k^{-1} u v^T \psi_k^{-1}}{\psi_{k+1k+1} - v^T \psi_k^{-1} u} \quad (21)$$

$$d = -\frac{v^T \psi_k^{-1}}{\psi_{k+1k+1} - v^T \psi_k^{-1} u} \quad (22)$$

Using the above A, b, c, and d, the k+1×k+1 matrix, $\psi_{k+1}^{-1}$ can be represented by the following form:

$$\psi_{k+1}^{-1} = \begin{vmatrix} A & \vdots & b \\ \cdots & \cdots & \cdots \\ d^T & \vdots & c \end{vmatrix} \quad (23)$$

Additionally, k is increased by 1 (that is, k=k+1)
Step 5:
—If $e_n$ is not larger than $e_c$, determine whether one epoch of patterns are to be presented to the network.
And if one epoch of patterns are presented to the network, estimate the rms error of the network given by equation (10)
—Otherwise, go to step 1 for the next input pattern (that is, n=n+1)
Step 6: If one epoch of patterns are presented to the network, compare the rms error of the network and the specified error
Step 7:
—If $E_{rms}$>specified error, decrease the error criteria, $e_c$ by decrement rate, $r_e$ satisfying $e_c = r_e e_c$, and go to step 1 with the first input pattern (that is, n=1)
—Otherwise, stop Phase 2 Learning: Estimation of Parameters of Kernel Functions After phase 1 learning, the position of kernel functions represent the reference points of the teaching patterns, i.e., the network generates the exact values at the positions of kernel functions. However, this is not so desirable from the view point of interpolation between the positions of kernel functions and of noisy teaching patterns. Accordingly, the parameters of kernel functions are adjusted in such a way to minimize the root mean square error for one epoch of teaching pattern, that is, based on a recursive least square algorithm (D. G. Luenberger; Introduction to Linear and Nonlinear Programming, Addison-Wesley, 1973).

The parameter estimation is summarized as follows:
Step 8: Estimation of parameter between the output layer and the hidden layer.

Estimation Procedure (Initial Condition: k=1 and $N_{epoch}=0$)

(1) Present a new input pattern, $x_k$ to the network.
(2) Get an actual output of the network, $\hat{y}_k = \Phi(x_k)$.
(3) Calculate an error of the network, $e_k = y_k - \hat{y}_k$.
(4) Update the parameter vector, $\sigma_{k+1}$ according to the following:

$$\sigma_{k+1} = \sigma_k + a_k e_k \quad (24)$$

Where, the k-th vector, $a_k$ is $$a_k = B_k h_k \quad (25)$$

and the k-th vector, $h_k$ and the k×k matrix, $B_k$ are $$h_k = \frac{\partial \hat{y}_k}{\partial \sigma}(\sigma_k) \quad (26)$$

$$B_k = B_{k-1} - \frac{B_{k-1} h_k h_k^T B_{k-1}}{1 + h_k^T B_{k-1} h_k} \quad (27)$$

(5)
—If one epoch of patterns are presented to the network, increase the epoch of patterns by 1 (that is $N_{epoch} = N_{epoch} + 1$), and if $N_{epoch}$<specified number, go to (1) with the first input pattern (that is k=1). Otherwise, stop.

—If one epoch of patterns are not presented to the network, go to (1) with the next input pattern, k=k+1.

Step 9: Estimation of parameter between the hidden layer and the input layer.

Estimation Procedure (Initial Condition: k=1 and $N_{epoch}=0$)

(1) Present a new input pattern, $x_k$ to the network.
(2) Get an actual output of the network, $\hat{y}_k=\Phi(x_k)$.
(3) Calculate an error of the network, $e_k=y_k-\hat{y}_k$.
(4) Update the output weight vector, $c_{k+1}$ of kernel functions according to the followings:

$$c_{k+1}=c_k+a_k e_k \qquad (28)$$

Where the k-th vectors $a_k$ is $$a_k=B_k h_k \qquad (29)$$

And the k-th vector, $h_k$ and the k×k matrixs $B_k$ are given by $$h_k = [\psi_{k,1}, \psi_{k,2} \ldots, \psi_{k,M}]^T \qquad (30)$$

$$B_k = B_{k-1} - \frac{B_{k-1} h_k h_k^T B_{k-1}}{1 + h_k^T B_{k-1} h_k} \qquad (31)$$

(5)

—If one epoch of patterns are presented to the network, increase the epoch of patterns by 1 (that is $N_{epoch}=N_{epoch}+1$), and if $N_{epoch}$<specified number, go to (1) with the first input pattern (that is k=1). Otherwise, stop.

—If one epoch of patterns are not presented to the network, go to (1) with the next input pattern, k=k+1.

The whole learning sequence is going through phase 1 related to the estimation of number of kernel functions and phase 2 related to the parameter estimation of the network. The number of iterations of phase 1 learning can be decided by user's requirement on the desired level of accuracy of the network. For the phase 2 learning processes, it usually takes 2 or 3 epochs to achieve the near local optimal parameters. The phase learning processes can be continuously performed in an alternate way for the further minimization of network error, This helps to find the near global optimal parameters.

<Embodiments>

The suggested learning algorithm is applied to a two dimensional function approximation and chaotic time-series prediction.

For an embodiment of two dimensional function approximation, the following sinusoidal function is considered:

$$f(x,y)=0.4\sin(\pi,x)+0.6\cos(\pi,y) \qquad (32)$$

Where the domains of x and y are restricted by the values between −1 and 1.

Figure 3A:
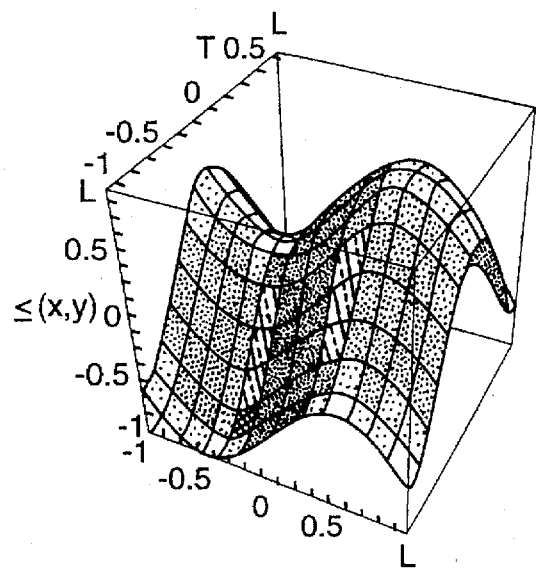
FIGS. 3a–3c show examples for two dimensional data.

The 3-D mesh graph of f(x,y) is shown in FIG. 3(a). For the teaching patterns, 1000 patterns are randomly selected from the given function, and another 1000 randomly selected patterns are used for the test patterns to evaluate the performance of training.

Figure 3B:
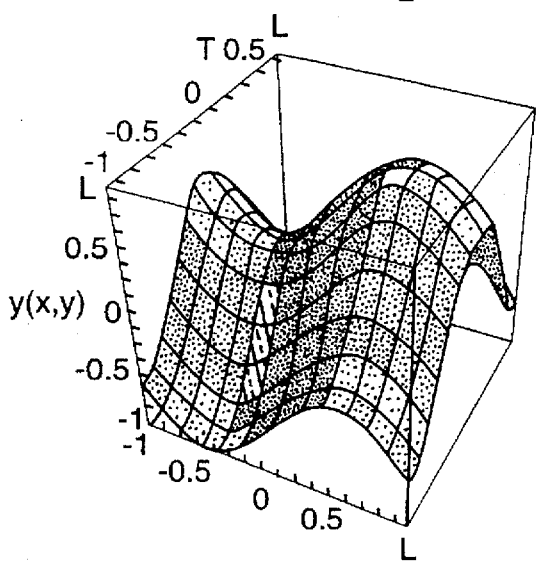
Figure 3C:
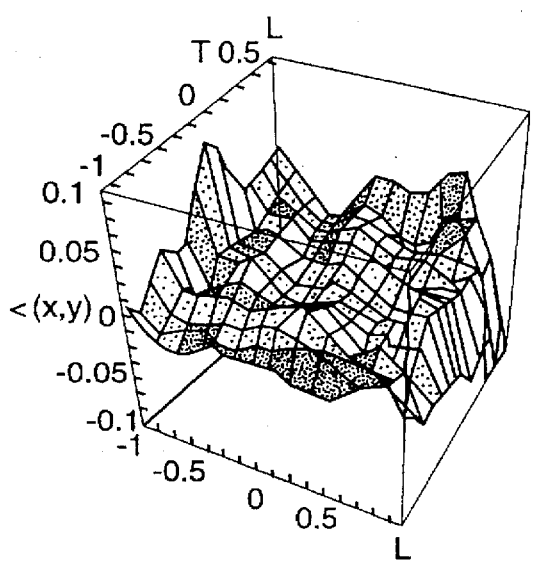

For the input pattern, 15 epochs of phase 1 learning and 2 epochs of phase 2 are applied for parameter estimation of kernel functions. The three dimensional Figure of the actual output is illustrated in FIG. 3(b), and the error after learning is illustrated in FIG. 3(c). In this error curve, the error values near the boundary of input space domain appear high value since relatively smaller number of teaching patterns are trained in this region. The rms error of this training is evaluated as 0.0155. For this level of performance, 34 kernel functions are recruited.

According to the Error Back Propagation method (D. E. Rumelhart, G. E. Hinton, and R. J. Williams, Parallel Distributed Processing, volume 1, pages 318–362, MIT Press/Bradford Books, 1986) using the similar network to the above (S. Lee and R. M. Kill "Nonlinear system control based on Gaussian potential function network," IEEE International Symposium on Intelligent Control, pages 423–429, 1991.)(S. Lee and R. M. Kil. "A gaussian potential function network with hierarchically self-organizing learning," Neural Networks, 4(2) :207–224, 1991), 18 Gaussian units are recruited in order to achieve the similar level of performance. However, in this approach, it takes more than 100 times of processing time.

As for chaotic time-series prediction, Mackey-Glass (M-G) chaotic time-series (A. S. Lapedes and R. Father. "Nonlinear signal processing using neural networks: Prediction and system modeling," Technical Report LA-UR-87-2662, Los Alamos National laboratory, 1987),(A. S. Lapedes and R. Farber. "How Neural network," Neural Information Processing System, pages 442–456, 1988) which is characterized by randomness and nonlinearity is selected. The discrete version of the M-G time-series is described by $$x(t+1)=(1-a)x(t)+\frac{bx(t-\gamma)}{1+x^{10}(t-\gamma)} \qquad (33)$$

Figure 4A:
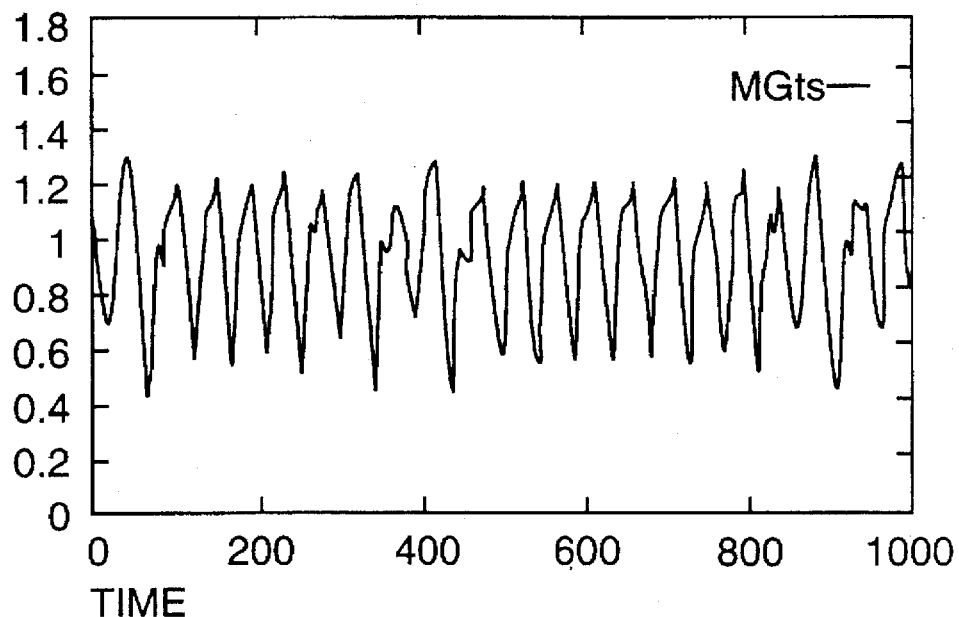
FIGS. 4a–4b are an example of prediction of chaotic time-series.

By setting a=0.1, b=0.2, and γ=17, a chaotic time series with distinctive characteristic of randomness and nonlinearity is produced (See FIG. 4(a)).

For past data, x(t), x(t−6), x(t−12) and x(t−18) are used for the estimation of M-G chaotic time-series, and a future data, x(t+85) after 85 steps is used to be predicted. The suggested network are trained with the 500 training data generated by equation (33) and tested with the succeeding 500 data.

Figure 4B:
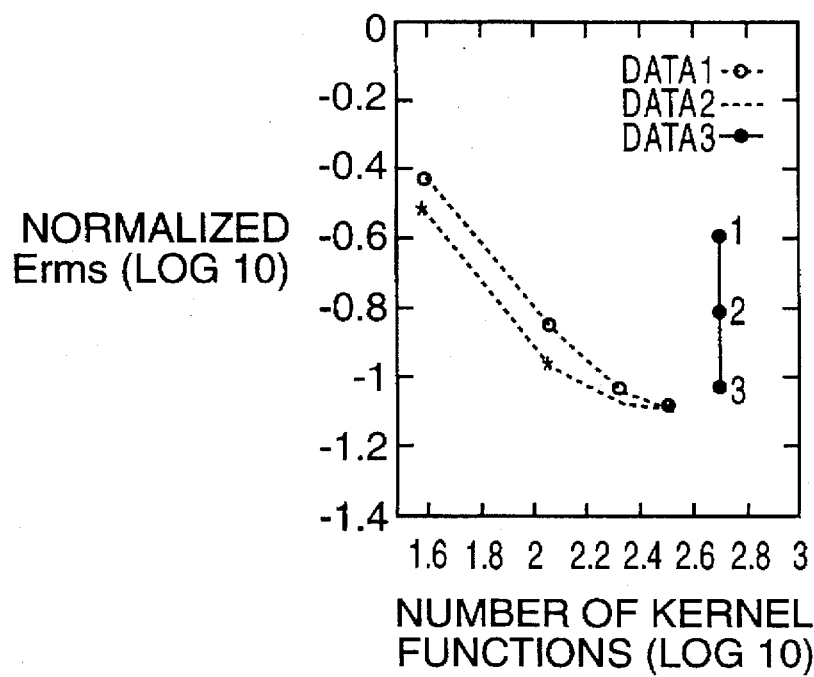

FIG. 4(b) shows the comparing result of prediction performance between the method according to the invention and the similar method thereto (J. Moody and C. J. Darken. "Fast learning in networks of locally-tuned processing units," Neural Computation, 1;281–294, 1989.).

The curves shown in FIG. 4(b) illustrate the prediction accuracy versus the number of kernel functions for the testing data. Here, data 1 and data 2 respectively represent the prediction accuracy after phase 1 learning process, and after phases 1 and 2 learning processes while the number in data 3 represents the prediction accuracy for different learning methods (J. Moody and C. J. Darken. "Fast learning in networks of locally-tuned processing units," Neural Computation, 1:281–292, 1989.). In data 3, 500 teaching patterns are used for 1 and 2 while 5000 teaching patterns are used for 3.

The embodiment results show that the testing data begin to level off around 300 kernel functions. This indicates that 500 training data are not sufficient for sufficient prediction accuracy. Additionally, the results show that the suggested method is effective in terms of the number of kernel functions and teaching patterns as compared with the similar predicting method (J. Moody and C. J. Darken. "Fast learning in networks of locally-tuned processing units," Neural computation, 1:281–294, 1989.). For instance, according to 3 of data 3, around 2 times more processing units and 10 times more training data are required to achieve the similar level of prediction accuracy.

Although the present invention has been described and illustrated in detail, it is clearly understood that the same is by way of illustration and example only and is not to be taken by way of limitation, the spirit and scope of the present invention being limited by the terms of the appended claims.

What is claimed is:

1. A learning method of a non-linear network consisting of three layers, an input layer, an output layer and a hidden layer comprising:

determining a number of kernel functions in accordance with a requirement for a level of accuracy by:
   a) presenting a new input pattern to the network,
   b) getting an actual output of the network and calculating an error of the network,
   c) comparing said error of the network with an error criteria,
   d) recruiting a new kernel function, adjusting a k+1-tb output weight vector of the new kernel function, and increasing k by 1 when the error is larger than the error criteria,
   e) determining whether one epoch of patterns is to be presented to the network when the error is not larger than the error criteria, and estimating the rms of the network if one epoch of patterns is presented to the network, otherwise, going to step a) with a next input pattern,
   f) comparing the rms of the network with the specified error when one epoch of patterns is presented to the network, and
   g) going to step a) with the first input pattern after decreasing the error criteria by a decrement rate when the rms of the network is larger than the specified error, and then
   estimating parameters of the network for non-linear function approximation, by applying a linear learning rule between the output layer and the hidden layer while applying a non-linear learning rule between the hidden layer and the input layer.

2. The learning method of the non-linear network for non-linear function approximation according to claim 1, wherein the parameter estimation between the output layer and the hidden layer further comprises the steps of:

presenting a new input pattern to the network,
   getting an actual output of the network, and calculating an error of the network,
   updating a parameter vector of kernel functions,
   increasing the epoch of patterns by 1, and going to said determining step with the first input pattern if the epoch of patterns is not larger than the specified number when one epoch of patterns is presented to the network, and
   going to said determining step with the next input pattern when one epoch of patterns is not presented to the network.

3. The learning method of the non-linear network for non-linear function approximation according to claim 2, wherein the parameter estimation between the hidden layer and the input layer further comprises the steps of:

presenting a new input pattern to the network,
   getting an actual output of the network, and calculating an error of the network,
   updating an output weight vector of kernel functions,
   increasing the epoch of patterns by 1, and going to said determining step with the first input pattern if the epoch of patterns is not larger than the specified number when one epoch of patterns is presented to the network, and
   going to said determining step with the next input pattern when one epoch of patterns is not presented to the network.

4. The learning method of the non-linear network for non-linear function approximation according to claim 1, wherein the parameter estimation between the hidden layer and the input layer further comprises the steps of:

presenting a new input pattern to the network,
   getting an actual output of the network, and calculating an error of the network,
   updating an output weight vector of kernel functions,
   increasing the epoch of patterns by 1, and going to said determining step with the first input pattern if the epoch of patterns is not larger than the specified number when one epoch of patterns is presented to the network, and
   going to said determining step with the next input pattern when one epoch of patterns is not presented to the network.

5. A learning method of a non-linear network consisting of three layers, an input layer, an output layer and a hidden layer comprising:

determining a number of kernel functions in accordance with a requirement for a level of accuracy by
   a) presenting a new input pattern to the network,
   b) getting an actual output of the network and calculating an error of the network,
   c) comparing said error of the network with an error criteria,
   d) recruiting a new kernel function, adjusting a k+1-th output weight vector of the new kernel function, and increasing k by 1 when the error is larger than the error criteria,
   e) determining whether one epoch of patterns is to be presented to the network when the error is not larger than the error criteria, and estimating the rms of the network if one epoch of patterns is presented to the network, otherwise, going to step a) with a next input pattern,
   f) comparing the rms of the network with the specified error when one epoch of patterns is presented to the network, and
   g) going to step a) with the first input pattern after decreasing the error criteria by a decrement rate when the rms of the network is larger than the specified error, and then
   estimating parameters of the network for chaotic time-series prediction, by applying a linear learning rule between the output layer and the hidden layer while applying a non-linear learning rule between the hidden layer and the input layer.

6. The learning method of the non-linear network according to claim 5, wherein the parameter estimation between the output layer and the hidden layer further comprises the steps of:

presenting a new input pattern to the network,
   getting an actual output of the network, and calculating an error of the network,
   updating a parameter vector of kernel functions,
   increasing the epoch of patterns by 1, and going to said determining step with the first input pattern if the epoch of patterns is not larger than the specified number when one epoch of patterns is presented to the network, and
   going to said determining step with the next input pattern when one epoch of patterns is not presented to the network.

7. The learning method of the non-linear network according to claim 6, wherein the parameter estimation between the hidden layer and the input layer further comprises the steps of:

presenting a new input pattern to the network, getting an actual output of the network, and calculating an error of the network, updating an output weight vector of kernel functions, increasing the epoch of patterns by 1, and going to said determining step with the first input pattern if the epoch of patterns is not larger than the specified number when one epoch of patterns is presented to the network, and going to said determining step with the next input pattern when one epoch of patterns is not presented to the network.

8. The learning method of the non-linear network according to claim 5, wherein the parameter estimation between the hidden layer and the input layer further comprises the steps of:

presenting a new input pattern to the network, getting an actual output of the network, and calculating an error of the network, updating an output weight vector of kernel functions, increasing the epoch of patterns by 1, and going to said determining step with the first input pattern if the epoch of patterns is not larger than the specified number when one epoch of patterns is presented to the network, and going to said determining step with the next input pattern when one epoch of patterns is not presented to the network.

\* \* \* \* \*